(12) United States Patent
Chai et al.

(10) Patent No.: US 11,941,875 B2
(45) Date of Patent: Mar. 26, 2024

(54) PROCESSING PERSPECTIVE VIEW RANGE IMAGES USING NEURAL NETWORKS

(71) Applicant: Waymo LLC, Mountain View, CA (US)

(72) Inventors: Yuning Chai, San Mateo, CA (US); Pei Sun, Palo Alto, CA (US); Jiquan Ngiam, Mountain View, CA (US); Weiyue Wang, Sunnyvale, CA (US); Vijay Vasudevan, Los Altos Hills, CA (US); Benjamin James Caine, San Francisco, CA (US); Xiao Zhang, San Jose, CA (US); Dragomir Anguelov, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 303 days.

(21) Appl. No.: 17/443,674

(22) Filed: Jul. 27, 2021

(65) Prior Publication Data

US 2022/0044068 A1 Feb. 10, 2022

Related U.S. Application Data

(60) Provisional application No. 63/057,210, filed on Jul. 27, 2020.

(51) Int. Cl.
*G06V 20/00* (2022.01)
*G01S 7/48* (2006.01)
(Continued)

(52) U.S. Cl.
CPC ............ *G06V 20/00* (2022.01); *G01S 7/4802* (2013.01); *G01S 17/89* (2013.01); *G06F 18/213* (2023.01);
(Continued)

(58) Field of Classification Search
CPC .......... G06V 20/00; G06V 10/95; G06T 7/70; G06T 3/4046; G06T 2207/20084;
(Continued)

(56) References Cited

U.S. PATENT DOCUMENTS

2008/0294315 A1   11/2008 Breed
2010/0104199 A1   4/2010 Zhang et al.
(Continued)

FOREIGN PATENT DOCUMENTS

KR   1020190089791   7/2019

OTHER PUBLICATIONS

Caesar et al., "nuScenes: A multimodal dataset for autonomous driving," Proceedings of the IEEE/CVF Conference on Computer Vision and Pattern Recognition, 2020, pp. 11621-11631.
(Continued)

*Primary Examiner* — Michael R Neff
(74) *Attorney, Agent, or Firm* — Fish & Richardson P.C.

(57) ABSTRACT

Methods, computer systems, and apparatus, including computer programs encoded on computer storage media, for processing a perspective view range image generated from sensor measurements of an environment. The perspective view range image includes a plurality of pixels arranged in a two-dimensional grid and including, for each pixel, (i) features of one or more sensor measurements at a location in the environment corresponding to the pixel and (ii) geometry information comprising range features characterizing a range of the location in the environment corresponding to the pixel relative to the one or more sensors. The system processes the perspective view range image using a first neural network to generate an output feature representation. The first neural network comprises a first perspective point-set aggregation layer comprising a geometry-dependent kernel.

20 Claims, 5 Drawing Sheets

(51) Int. Cl.
| | |
|---|---|
| *G01S 17/89* | (2020.01) |
| *G06F 18/21* | (2023.01) |
| *G06F 18/213* | (2023.01) |
| *G06F 18/25* | (2023.01) |
| *G06N 3/08* | (2023.01) |
| *G06T 7/70* | (2017.01) |
| *G06V 10/94* | (2022.01) |
| *H04N 23/10* | (2023.01) |

(52) U.S. Cl.
CPC .......... *G06F 18/217* (2023.01); *G06F 18/253* (2023.01); *G06N 3/08* (2013.01); *G06T 3/4046* (2013.01); *G06T 7/70* (2017.01); *G06V 10/95* (2022.01); *H04N 23/10* (2023.01); *G06T 2207/20084* (2013.01)

(58) Field of Classification Search
CPC .... G06F 18/253; G06F 18/217; G06F 18/213; H04N 23/10; G01S 7/4802; G01S 17/89
USPC ......................................................... 382/103
See application file for complete search history.

(56) References Cited

U.S. PATENT DOCUMENTS

| | | |
|---|---|---|
| 2016/0070265 A1 | 3/2016 | Liu et al. |
| 2016/0325753 A1 | 11/2016 | Stein et al. |

OTHER PUBLICATIONS

Carion et al., "End-to-end object detection with transformers," CoRR, May 2020, arXiv:2005.12872, 26 pages.
Chang et al., "Shapenet: An information-rich 3d model repository," CoRR, Dec. 2015, arXiv:1512.03012, 11 pages.
Cheng et al., "Improving 3d object detection through progressive population based augmentation," European Conference on Computer Vision, Nov. 2021, pp. 279-294.
Dai et al. "Scannet: Richly-annotated 3d reconstructions of indoor scenes," Proceedings of the IEEE Conference on Computer Vision and Pattern Recognition, 2017, pp. 5828-5839.
Devlin et al., "Bert: Pre-training of deep bidirectional transformers for language understanding," CoRR, May 2019, arXiv:1810.04805, 16 pages.
Geiger et al., "Are we ready for autonomous driving? The KITTI vision benchmark suite," 2012 IEEE Conference on Computer Vision and Pattern Recognition, Jun. 2012, 8 pages.
Graham et al., "Submanifold sparse convolutional networks," CoRR, Jun. 2017, arXiv:1706.01307, 10 pages.
Huang et al., "An LSTM approach to temporal 3D object detection in lidar point clouds," European Conference on Computer Vision, Dec. 2020, pp. 266-282.
Lang et al., "Pointpillars: Fast encoders for object detection from point clouds," Proceedings of the IEEE/CVF Conference on Computer Vision and Pattern Recognition, 2019, pp. 12697-12705.
Li et al., "Vehicle detection from 3d lidar using fully convolutional network," CoRR, Aug. 2016, arxiv.org/abs/1608.07916, 8 pages.
Liu et al., "SSD: Single shot multibox detector," European Conference on Computer Vision, Sep. 2016, pp. 21-37.
Meyer et al., "Lasernet: An efficient probabilistic 3d object detector for autonomous driving," Proceedings of the IEEE/CVF Conference on Computer Vision and Pattern Recognition, 2019, pp. 12677-12686.
Ngiam et al., "Starnet: Targeted computation for object detection in point clouds," CoRR, Aug. 2019, arXiv: 1908.11069, 12 pages.
Qi et al., "Deep hough voting for 3d object detection in point clouds," Proceedings of the IEEE/CVF International Conference on Computer Vision, 2019, pp. 9277-9286.
Qi et al., "Frustum pointnets for 3d object detection from rgb-d data," Proceedings of the IEEE conference on computer vision and pattern recognition, 2018, pp. 918-927.
Qi et al., "Guibas Pointnet++: Deep hierarchical feature learning on point sets in a metric space," CoRR, Jun. 2017, arxiv.org/abs/1706.02413, 14 pages.
Qi et al., "Pointnet: Deep learning on point sets for 3d classification and segmentation," Proceedings of the IEEE Conference on Computer Vision and Pattern Recognition, 2017, pp. 652-660.
Ronneberger et al., "U-net: Convolutional networks for biomedical image segmentation," International Conference on Medical Image Computing and Computer-Assisted Intervention, Nov. 2015, pp. 234-241.
Shi et al., "PointRCNN: 3D object proposal generation and detection from point cloud," Proceedings of the IEEE/CVF Conference on Computer Vision and Pattern Recognition, 2019, pp. 770-779.
Shi et al., "PV-RCNN: Point-voxel feature set abstraction for 3d object detection," Proceedings of the IEEE/CVF Conference on Computer Vision and Pattern Recognition, 2020, pp. 10529-10538.
Song et al., "Sun rgb-d: A rgb-d scene understanding benchmark suite," Proceedings of the IEEE Conference on Computer Vision and Pattern Recognition, 2015, pp. 567-576.
Sun et al., "Scalability in perception for autonomous driving: Waymo open dataset," Proceedings of the IEEE/CVF Conference on Computer Vision and Pattern Recognition, 2020, pp. 2446-2454.
Uy et al., "Revisiting point cloud classification: A new benchmark dataset and classification model on real-world data," Proceedings of the IEEE/CVF International Conference on Computer Vision, 2019, pp. 1588-1597.
Vaswani et al., "Attention is all you need," Advances in Neural Information Processing Systems 30, 2017, 11 pages.
Wang et al., "Dynamic graph CNN for learning on point clouds," ACM Transactions on Graphics, Nov. 2019, 146146:1-12.
Wu et al., "3D shapenets: A deep representation for volumetric shapes," Proceedings of the IEEE Conference on Computer Vision and Pattern Recognition, 2015, pp. 1912-1920.
Yan et al. "Second: Sparsely embedded convolutional detection," Sensors, Oct. 2018, 18(10):3337.
Zhou et al., "Objects as points," CoRR, Apr. 2019, arXiv:1904.07850, 12 pages.
Zhou et al., "Voxelnet: End-to-end learning for point cloud based 3D object detection," Proceedings of the IEEE Conference on Computer Vision and Pattern Recognition, 2018, pp. 4490-4499.
International Search Report and Written Opinion in International Appln. No. PCT/US2021/071006, dated Nov. 5, 2021, 11 pages.
Zhou et al., "End-to-end multi-view fusion for 3D object detection in LiDAR point clouds," Proceedings of the Conference on Robot Learning, PMLR, 100:923-932.

PROCESSING PERSPECTIVE VIEW RANGE IMAGES USING NEURAL NETWORKS

CROSS-REFERENCE TO RELATED APPLICATION

This application claims priority to U.S. Provisional Patent Application No. 63/057,210, filed on Jul. 27, 2020, the disclosure of which is hereby incorporated by reference in its entirety.

BACKGROUND

This specification relates to processing sensor data, e.g., laser sensor data, using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes technologies that relate to processing sensor data using neural networks.

In one innovative aspect there is described a method of processing input data to generate a network output that characterizes a scene, i.e., an output for a particular scene understanding task. The input data includes a perspective view range image generated from sensor measurements of an environment by one or more sensors. The perspective view range image includes a plurality of pixels arranged in a two-dimensional grid. For each pixel, the perspective view image includes (i) features of one or more sensor measurements at a location in the environment corresponding to the pixel and (ii) geometry information including range features characterizing a range of the location in the environment corresponding to the pixel relative to the one or more sensors. The perspective view range image is processed using a first neural network to generate an output feature representation. The first neural network includes a first perspective point-set aggregation layer configured to: receive an input feature map that includes a respective feature vector for each of a first subset of the pixels, and generate an output feature map from the input feature map. The output feature map includes a respective output feature vector for each of the first subset of pixels. For each particular pixel in the first subset, the first neural network is configured to generate an initial output feature vector for the particular pixel by applying a geometry-dependent kernel to pixels within a local neighborhood of the particular pixel in the input feature map. The geometry-dependent kernel depends on at least (i) respective input feature vectors for the pixels within the local neighborhood of the particular pixel in the input feature map and (ii) respective range features of the pixels within the local neighborhood of the input feature map. The output feature representation is processed using an output neural network to generate a network output for a neural network task.

In some implementations, the neural network task is object detection and the network output identifies portions of the environment where objects are located.

In some implementations, the perspective view range image is generated from sensor measurements from a LiDAR sensor sweeping through the environment. One dimension of the two-dimensional grid corresponds to beams of the LiDAR sensor and wherein the other dimension of the two-dimensional grid corresponds to regions of the environment swept through by the LiDAR sensor.

In some implementations, the perspective view range image is generated from sensor measurements from an RGBD camera.

In some implementations, the first neural network further includes a two-dimensional convolutional layer that has a kernel that depends only on feature vectors and not on range features.

In some implementations, the method father includes obtaining validity data that indicates, for each pixel in the range image, whether the sensor measurements for the pixel are valid. The geometry-dependent kernel also depends on, for each pixel in the local neighborhood, whether the sensor measurements for the pixel are valid. In particular, the geometry-dependent kernel can assign the initial output feature vector for each pixel for which the sensor measurements are not valid to a zero vector.

In some implementations, the geometry-dependent kernel is a geometry-dependent convolution kernel that, when generating the initial output feature vector for each particular pixel for which the sensor measurements are valid, applies different convolution weights to input feature vectors of pixels depending on a range difference between the pixel and the particular pixel as reflected by the geometry information. For example, the geometry-dependent kernel can include k sets of convolution weights. Each of the k sets of convolution weights has a respective scalar range. The convolution weights that are applied to input feature vectors of a given pixel for which the sensor measurements are valid are a combination of sets of convolution weights having respective scalar ranges that are satisfied by the range difference between the pixel and the particular pixel.

In some implementations, the geometry-dependent kernel is a self-attention kernel that applies a self-attention mechanism over the local neighborhood using queries, keys, and values for the pixels in the local neighborhood that are generated from the input feature vectors for the pixels in the local neighborhood. For each pixel in the local neighborhood for which the sensor measurements are valid, at least the key for the pixel is augmented with a positional encoding that represents a relative location of the pixel to the particular pixel as reflected by the geometry information.

In some implementations, for each pixel in the local neighborhood for each particular pixel for which the sensor measurements are valid, the geometry-dependent kernel is a kernel that: for each pixel in the local neighborhood for which the sensor measurements are valid, processes (i) the input feature vector for the pixel in the local neighborhood and (ii) a positional encoding that represents a relative location of the pixel to the particular pixel as reflected by the respective geometry information for the pixel and the particular pixel using an encoder neural network to generate encoded features for the pixel, and applies max-pooling to the encoded features for the pixels in the local neighborhood to generate the initial output feature vector for the particular pixel.

In some implementations, for each pixel in the local neighborhood for each particular pixel for which the sensor measurements are valid, the geometry-dependent kernel is a kernel that: for each pixel in the local neighborhood for which the sensor measurements are valid, processes (i) the input feature vector for the pixel in the local neighborhood, (ii) a positional encoding that represents a relative location of the pixel to the particular pixel as reflected by the respective geometry information for the pixel and the particular pixel, and (iii) the input feature vector for the particular pixel using an encoder neural network to generate encoded features for the pixel, and applies max-pooling to the encoded features for the pixels in the local neighborhood to generate the initial output feature vector for the particular pixel.

In some implementations, the first neural network further includes one or more down-sampling layers that down-sample an input feature map based in part on the validity data. The first neural network can further include one or more up-sampling layers.

In some implementations, the method further includes generating the input feature map by fusing camera image features with (i) features from the perspective view range image, (ii) output features generated by another neural network layer in the first neural network, or both.

There is also provided a system including one or more computers and one or more storage devices storing instructions that when executed by the one or more computers cause the one or more computers to perform the method described above.

There is also provided one or more computer storage media storing instructions that when executed by one or more computers, cause the one or more computers to perform the method described above.

3D point cloud understanding is important for many robotic applications. In many cases, the point cloud is projected into the 3D Cartesian space from a native 2D perspective view range image created by the scanning sensor. Existing attempts at applying neural networks for 3D point cloud understanding have mostly opted to operate in this 3D space.

The described techniques, however, generate a point cloud representation in the perspective view range space. To this end, the described techniques adapt a conventional 2D convolutional network architecture and replace the core inner product kernel of the convolution with kernels that can exploit the underlying geometry of the local neighborhood around each pixel. Because of this, the described techniques can be used to more accurately and efficiently generate any of a variety of point cloud understanding outputs.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
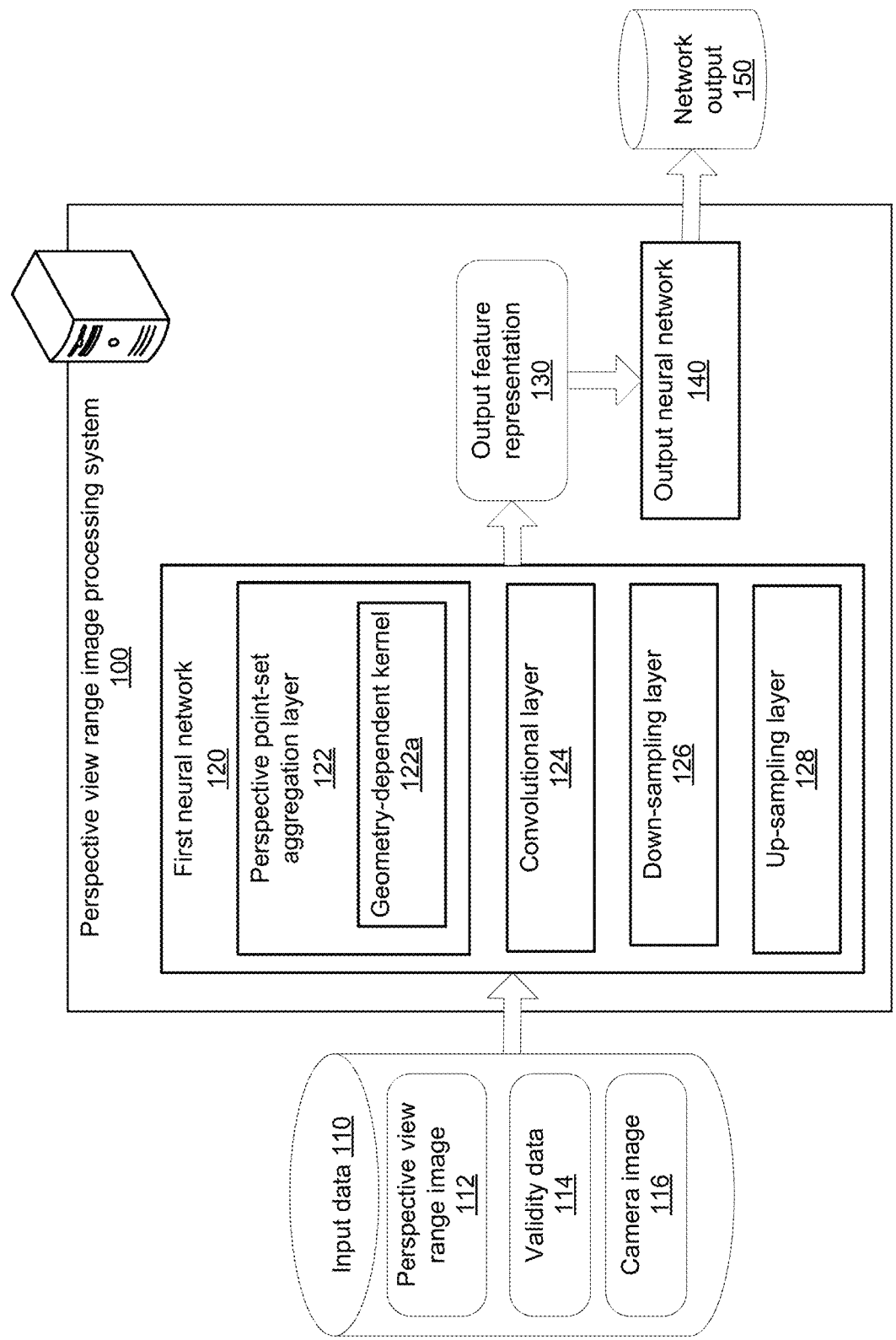
FIG. 1 shows an example perspective view range image processing system.

FIG. 1 shows an example of a perspective view range image processing system 100. The system 100 is an example of a system implemented as computer programs on one or more computers in one or more locations, in which the systems, components, and techniques described below can be implemented.

In general, the system 100 processes input data 110 representing one or more sensor measurements of a scene captured by one or more sensors to generate a network output 150 that characterizes the scene i.e., an output for a particular scene understanding task. For example, the output can be an object detection output that identifies the locations of one or more objects in the scene or a different kind of output that characterizes different properties of objects in the scene. In one example, the output includes predicted bounding boxes that identify locations and geometries of objects of interests in the scene, such as vehicles, pedestrians, or road signs. In another example, the output includes predicted object types (e.g. road, vegetation, vehicle, pedestrian, etc.) of each sensor data point (e.g. each LiDAR point).

In one example, the one or more sensors can be sensors of an autonomous vehicle, e.g., a land, air, or sea vehicle, and the scene can be a scene that is in the vicinity of the autonomous vehicle. The network output can then be used to make autonomous driving decisions for the vehicle, to display information to operators or passengers of the vehicle, or both.

In particular, the system 100 processes the input data 100 using a first neural network 120 to generate an output feature representation 130. To leverage the geometry information and unlike a conventional convolutional neural network (CNN), the first neural network 120 includes one or more perspective point-set aggregation layers 122. Each perspective point-set aggregation layer 122 is configured to receive an input feature map that includes a respective feature vector for each of a subset of the pixels, and generate an output feature map from the input feature map. The system 100 further uses an output neural network 140 to process the output feature representation 130 to generate the network output 150.

The input data 110 includes data for a perspective view range image 112. The perspective view range image 112 can be generated from sensor measurements of an environment by one or more sensors, and includes a plurality of pixels arranged in a two-dimensional (2D) grid.

For each pixel of the perspective view range image, the data includes features of one or more sensor measurements at a location in the environment corresponding to the pixel. The data further includes, for each pixel, geometry information including range features characterizing a range of the location in the environment corresponding to the pixel relative to the one or more sensors. The range refers to a distance between the location in the environment and a reference location (e.g., the location of the sensor) in a line-of-sight direction of the sensor.

In one example, the perspective view range image is generated from measurements of one or more laser sensors (e.g., LiDAR sensors) that are configured to detect reflections of laser light. More specifically, a laser sensor or other sensor can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in zenith angle, azimuth angle, or both. Sweeping in azimuth, for example, can allow a sensor to detect multiple objects along the same line of sight.

In some implementations, one dimension of the two-dimensional grid corresponds to beams of the LiDAR sensor and the other dimension of the two-dimensional grid corresponds to regions of the environment swept through by the LiDAR sensor. For example, in applications such as in the field of robotics and autonomous driving, a LiDAR device can continuously scan the surrounding environment in a rotating pattern with multiple laser beams, producing a 2D scan pattern that forms the 2D perspective view range image. Each pixel in this image corresponds to a range value (based on the return time of the reflection signal) and other features such as the intensity of each laser return.

In another example, the perspective view range image 112 is generated from sensor measurements from an RGBD camera. For example, the RGBD camera can generate a 2D map with each pixel corresponding to a depth value and other features such as RGB intensities.

In some implementations, the input data 110 further includes validity data 114 that indicates, for each pixel in the perspective view range image 112, whether the sensor measurement for the pixel is valid. The sensor measurement for the pixel can be considered valid when measurement data is available for the pixel. Data may be missing for certain pixels in the perspective view range image. For example, LiDAR range or RGBD images can have invalid range data for a portion of pixels due to light-absorbing or less reflective surfaces. Further, in the case of LiDAR, quantization and calibration artifacts can result in missing returns. In order to ensure that the invalid pixels due to missing data do not affect the subsequent processing, the system 100 can use the validity data 114 in the subsequence processing steps.

In some implementations, the input data 110 further includes camera image data 116. In some applications, camera image data is available in addition to the perspective view range image data. For example, for perspective view range images obtained by a LiDAR device installed on an autonomous vehicle, camera images capturing views from the front and sides of the vehicle may be available for the respective frames. The system 100 can further utilize the camera images to generate feature representations of the scene.

The system 100 processes the input data 110 using the first neural network 120 to generate the output feature representation 130 that includes a respective feature vector for each pixel in an output feature map. Generally, depending on the implementation, the output feature representation can include the same number of pixels as or fewer pixels than the perspective view range image 112 in the input data.

The first neural network 120 can be generally termed as a perspective point cloud (PPC) neural network, because the neural network includes one or more neural network layers configured to process the perspective view range image in the 2D perspective view range space (instead of in a 3D world-coordinate point cloud space) by exploiting the underlying 3D structure of the perspective view range features of the pixels.

In particular, the first neural network 120 includes one or more perspective point-set aggregation layers 122. Each perspective point-set aggregation layer 122 is configured to receive an input feature map, and process the input feature map to generate an output feature map. The input feature map includes a respective feature vector for each of a subset of the pixels in the perspective view range image 112. In some cases, i.e., if the range image has not been down-sampled prior to processing by the layer, the first subset is the entire set of pixels in the range image. In some other cases, i.e., if down-sampling has already been applied, the first subset is a proper subset of the set of pixels. The input feature map for a particular perspective point-set aggregation layer can be obtained based on the perspective view range image or based on output features generated by one or more other neural network layers in the first neural network.

The output feature map includes a respective output feature vector for each of the subset of pixels.

For each particular pixel in the subset of pixels, the system 100 generates the respective output feature vector by applying a geometry-dependent kernel 122a to pixels in a local neighborhood of the particular pixel in the input feature map. The geometry-dependent kernel depends on at least (i) respective input feature vectors for the pixels within the local neighborhood of the particular pixel in the input feature map and (ii) respective range features of the pixels within the local neighborhood of the input feature map. The kernel is referred to as "geometry-dependent" because the kernel depends on the three-dimensional geometry of the pixels in the local neighborhood as reflected in the geometry data and as measured by the sensor.

In some implementations, the geometry-dependent kernel also depends on, for each pixel in the local neighborhood, whether the sensor measurement for the pixel is valid as indicated by the validity data. For example, when processing using the geometry-dependent kernel, the system 100 can assign the initial output feature vector for each pixel for which the sensor measurements are not valid to a zero vector. Thus, the system 100 can ensure that the processing results are not affected by invalid pixels.

In particular, the input $F_i$ for a particular perspective point-set aggregation layer can have a shape of [H, W, D], where H and W are the dimensions of the input feature map and D is the number of channels being processed by the perspective point-set aggregation layer.

The output $F_i$ of the perspective point-set aggregation layer has a shape of [H, W, D'] with D' being the number of output channels being generated by the perspective point-set aggregation layer. That is, the perspective point-set aggregation layer can map an input tensor of shape [H, W, D] to an output tensor of shape [H, W, D']. At the first perspective point-set aggregation layer of the neural network, D is the number of input channels, including, e.g., channels for range, intensity, elongations, etc. At a perspective point-set aggregation layer after the first layer, D can be chosen to a number (e.g., 64 or 128) based on the network architecture. The validity data can be expressed by a binary mask $M_i$ of shape [H, W] that indicates the validity of each pixel of the input feature map.

In the following descriptions, the channel numbers D and D' in the depth dimension are omitted for simplicity. Thus, $F_i$ and $F_o$ represent the input and output feature maps for the layer, respectively.

Each pixel in the output feature map $F_o[m, n]$ is a function of the corresponding input feature and its neighborhood $F_i[m', n']$ where $m' \in [m-k_H/2, m+k_H/2]$ and $n' \in [n-k_W/2, n+k_W/2]$. $k_H$ and $k_W$ are neighborhood/kernel sizes along the height and width dimensions. The output feature map can be expressed as:

$$F_o[m,n] = f(\{F_i[m',n']\}, \{\forall m',n'\}, \{X_i[m',n'], [\forall m',n'], \{\forall m',n'\}, M_i[m',n'], \forall m',n'\}) \quad (1)$$

where f(•) is the geometry-dependent kernel that reduces information from multiple pixels to a single one.

According to Eq. (1), the geometry-dependent kernel f(•) depends on the input feature map $F_i$, the respective range features of the pixels (i.e., the per-pixel coordinate map $X_i$), and whether the sensor measurement for the pixel is valid (i.e., the binary mask $M_i$).

The process described by Eq. (1) have some similarities with processing an input map using a convolutional layer in a CNN. In both processes, the neural network layer applies a kernel to pixels in the local neighborhood of the particular pixel to be processed. However, the inner product kernel of a CNN layer depends only on input features of the input pixels and not on range features of the input pixels. For example, a 2D inner product kernel $f_{2D}$ for a CNN layer can be expressed as $$f_{2D}:=\Sigma_{m',n'}W[m'-m,n'-n]F_i[m',n'] \quad (2)$$

where W are a set of trainable weights.

Since the 2D inner product kernel $f_{2D}$ does not depend on the respective range features (i.e., the per-pixel coordinate map $X_i$), $f_{2D}$ cannot be easily used to exploit the range information and the underlying 3D geometry. By contrast, the geometry-dependent kernel depends on both the (i) respective input feature vectors for the pixels within the local neighborhood of the particular pixel in the input feature map and (ii) respective range features of the pixels within the local neighborhood of the input feature map. As a result, the geometry-dependent kernel can be used to exploit the underlying 3D geometry of the local neighborhood around each pixel.

In some implementations, the geometry-dependent kernel 122a can be a range-quantized convolution kernel.

The range-quantized convolution kernel is a kernel that, when generating the initial output feature vector for each particular pixel for which the sensor measurements are valid, applies different convolution weights to input feature vectors of pixels depending on a range difference between the pixel and the particular pixel as reflected by the geometry information. For example, the range-quantized convolution kernel can have k sets of convolution weights. Each of the k sets of convolution weights has a respective scalar range. The convolution weights that are applied to input feature vectors of a given pixel are a combination of sets of convolution weights having respective scalar ranges that are satisfied by the range difference between the pixel and the particular pixel.

The range-quantized convolution kernel provides a way of incorporating the range features to the layer by applying different sets of weights to the input feature depending on the relative range difference of each neighboring pixel to the center pixel. In one example, the range-quantized convolution kernel $f_{2D+}$ can be expressed as:

$$f_{2D+}:=\Sigma_{m',n'}W_r[m'-m,n'-n]F_i[m',n']\cdot\delta \quad (3)$$

$$W_r=\Sigma_{k\in L}\mathbb{1}_{[L_k\leq r\leq H_k]}W_k$$

$$r=R_i[m',n']-R_i[m,n]$$

where the system defines K sets of weights $W_k$, each with a predefined scalar range $[L_k, H_k]$. $\mathbb{1}$ is the indicator function and has the value 1 if the expression is true and 0 otherwise. δ is an indicator function based on the validity of each the participating pixels, defined as:

$$\delta=M_i[m',n']M_i[m,n] \quad (4)$$

According to Eq. (3), the system applies different weights depending on the range difference r. $R_i$ denotes the range feature based on $X_i$. The scalar ranges for the k sets of convolution weights can be different for different perspective point-set aggregation layers (when there are multiple perspective point-set aggregation layers in the first neural network), and can be computed from histograms over many input samples. For example, to determine the scalar ranges, a histogram of ranges from all points can be generated. The scalar ranges are chosen to make sure each range has similar number of points.

In some implementations, the geometry-dependent kernel 122a is a self-attention kernel that applies a self-attention mechanism over the local neighborhood using queries, keys, and values for the pixels in the local neighborhood that are generated from the input feature vectors for the pixels in the local neighborhood. For each pixel in the local neighborhood for which the sensor measurements are valid, the system 100 augments the key for the pixel with a positional encoding that represents a relative location of the pixel to the particular pixel (for which the output feature vector is being computed) as reflected by the geometry information.

The range image data is typically sparse in the 3D space. The self-attention kernel uses weights that depend on the input features and spatial locations of the features in the 3D space, and usually does not require a set of weights in a dense form.

In one example, the self-attention kernel $f_{SA}$ can be expressed as:

$$f_{SA}:=\Sigma_{m',n'}\text{soft max}(F_i[m,n]^T W_q^T(W_k F_i[m',n']+r))W_v F_i[m',n']\cdot\delta \quad (5)$$

$$r=W_r\gamma(X_i[m,n],X_i[m',n']) \quad (6)$$

where $W_q$, $W_k$, $W_v$ and $W_r$ are four sets of trainable weights. γ (•, •) is an asymmetric positional encoding between two points defined as:

$$\gamma(x_1,x_2):=R_{x_1}^T(p_2-p_1) \quad (7)$$

where $R_{x_1}$ is a rotation matrix defined by the azimuth and inclination of $x_1$, and $p_{\{1,2\}}$ are the Cartesian projection of polar coordinates $x_{\{1,2\}}$.

In some implementations, the geometry-dependent kernel 122a can be a PointNet kernel. The PointNet kernel is a kernel that, for each pixel in the local neighborhood for each particular pixel for which the sensor measurements are valid, the system processes, for each pixel in the local neighborhood for which the sensor measurements are valid, (i) the input feature vector for the pixel in the local neighborhood and (ii) a positional encoding that represents a relative location of the pixel to the particular pixel as reflected by the respective geometry information for the pixel and the particular pixel using an encoder neural network to generate encoded features for the pixel, and applies max-pooling to the encoded features for the pixels in the local neighborhood to generate the initial output vector for the particular pixel.

The PointNet kernel uses the encoder neural network, e.g., a multi-layer perceptron (MLP), that encodes the neighboring features and their relative coordinates to the center, and pools the encodings via max-pooling. In one example, the PointNet kernel $f_{PN}$ can be expressed as:

$$f_{PN}:=\max \text{MLP}(F_i[m',n'],\gamma(X_i[m,n],X_i[m',n']),\Theta)\cdot\delta \quad (8)$$

where Θ are trainable weights for the MLP.

In some implementations, the geometry-dependent kernel 122a can be an edge convolution kernel. The edge convolution kernel is a kernel that, for each pixel in the local neighborhood for each particular pixel for which the sensor measurements are valid, the system processes, for each pixel in the local neighborhood for which the sensor measurements are valid, (i) the input feature vector for the pixel in the local neighborhood, (ii) a positional encoding that represents a relative location of the pixel to the particular pixel as reflected by the respective geometry information for the pixel and the particular pixel, and (iii) the input feature vector for the particular pixel using an encoder neural network to generate encoded features for the pixel, and applies max-pooling to the encoded features for the pixels in the local neighborhood to generate the initial output vector for the particular pixel.

The edge convolution kernel has a formulation similar to the PointNet kernel. In the PointNet kernel, the input to the MLP includes the feature itself and a relative positional encoding. The edge convolution kernel further includes the center feature to the input. In one example, the edge convolution kernel $f_{EC}$ can be expressed as:

$$f_{EC} := \max \mathrm{MLP}(F_i[m',n'], F_i[m,n], \gamma(X_i[m',n']), \Theta) \cdot \delta \qquad (9)$$

3D point cloud understanding is important for many robotic applications. In many cases, the point cloud is projected into the 3D world-view space from a native 2D perspective view range image created by the scanning sensor. Existing attempts at applying neural networks for 3D point cloud understanding have mostly opted to operate in this 3D space.

The PPC neural network (the first neural network 120), however, generates a point cloud representation in the perspective view range space. To this end, the first neural network 120 can adapt a conventional 2D convolutional network architecture and replace the core inner product kernel of the convolution with kernels that can exploit the underlying geometry of the local neighborhood around each pixel. Because of this, the first neural network 120 can be used to more accurately and efficiently generate any of a variety of point cloud understanding outputs.

In some implementations, in addition to the one or more perspective point-set aggregation layers 122, the first neural network 120 can further include one or more 2D convolutional layers 124. The 2D convolutional layer has a kernel, e.g., the inner-product kernel of Eq. (2), which depends only on feature vectors and not on range features. Depending on the application, the system 100 can arrange a combination of perspective point-set aggregation layers and CNN layers in a suitable architecture to achieve a balance between model accuracy and computation efficiency.

In some implementations, the first neural network 120 further includes one or more down-sampling layers 126 that down-sample one or more input feature maps based in part on the validity data.

In the case of LiDAR data, quantization and calibration artifacts can result in missing returns that form a regular pattern, where the down-sampling with a fixed stride can inadvertently emphasize the missing returns. Therefore, the system 100 can instead use a validity-dependent down-sampling strategy to actively avoid missing returns. In an example, the down-sampling layer can be defined (in the one-dimensional space for brevity) as:

$$F_o[m] = F_i[\hat{m}], \; X_o[m] = X_i[\hat{m}], \; M_o[m] = M_i[\hat{m}] \qquad (10)$$

$$\hat{m} = \operatorname{argmin}_{m' \in S} \|R_i[m'] - \mu\|^2, \; \mu = \frac{\sum_{m' \in S} R_i[m']}{\|S\|_0}$$

where $S$ contains all s'∈m×S, ..., (m+1)×S−1, and S is the intended stride. $R_i$ is the range part of the polar coordinates $X_i$.

For example, when the system 100 use a down-sampling layer 126 to down-sample the input feature map with a stride of 2×2, it selects 1 pixel from 4 neighboring pixels. However, instead of always selecting the first or the last pixel, the down-sampling layer 126 selects a valid pixel, if available, which is the closest to the centroid of all valid pixels among the four.

In some implementations, the first neural network 120 further includes one or more up-sampling layers 128 that up-sample one or more input feature maps. The up-sampling process can mirror a previous down sampling (performed by a down-sampling layer 126). Therefore, the system 100 can store the coordinates and the mask from the input of a corresponding down-sampling layer 126, and reuse them for up-sampling. Thus, in an example, the up-sampling can be defined as:

$$X_o[m] = X_{i'}, \; M_o[m] = M_{i'}, \; F_o[m] = \begin{cases} F_i[\hat{m}], & \text{if } m = \hat{m} \\ 0, & \text{else} \end{cases} \qquad (11)$$

$$\hat{m} = \operatorname{argmin}_{m' \in S} \|X_o[m'] - \mu\|^2, \; \mu = \frac{\sum_{m' \in S} X_o[m']}{\|S\|_0}$$

where $S$ contains all s'∈$\overline{m}$×S, ..., (−m+1)×S−1 where S is the up-sampling stride. $X_{i'}$ and $M_{i'}$ are values taken from a previous layer i' whose down-sampling with stride S yields the input layer i.

In some implementations, the system 100 can further perform a fusing operation to fuse feature vectors in the input feature map with camera image features. For an input feature map for the first layer of the first neural network, the system can generate the input feature map by fusing camera image features with features from the perspective view range image 112. For a neural network layer that is not the first layer of the first neural network, the system can generate the input feature map by fusing camera image features with output features generated by another neural network layer in the first neural network 120.

In one example, the system 100 computes, for each camera image, features using a CNN (e.g., a convolutional U-network). For each pixel in the input feature map for a particular perspective point-set aggregation layer, the system projects the pixel to a location in the corresponding camera image. The system then combines, e.g., concatenates, the feature vector computed at that pixel in the camera image with the input feature vector at the pixel. This input fusing process can be applied at a selected layer in the first neural network 120.

The first neural network 120 can include one or more perspective point-set aggregation layers, one or more optional CNN layers, down-sampling layers, and up-sampling layers. The layers of the first neural network 120 can be arranged in a backbone architecture according to the application. Examples of the network architecture will be described below in more detail with reference to FIG. 2B.

Examples of backbone architectures of the first neural network 120 will be described in further details with reference to FIG. 2B.

After processing the input data using the first neural network 120 to generate the output feature representation 130, the system 100 processes the output feature representation 130 using the output neural network 140 to generate the network output 150 for a neural network task. For example, the neural network task can be an object detection task. The network output can identify portions of the environment where objects are located. In another example, the neural network task can be an object classification task and the network output can specify a classification of the scene indicated in the input data. The output neural network 140 can take any appropriate architecture to generate the network output 150.

The network parameters for the first neural network 120 and the output neural network 140 can be obtained in a training process based on a plurality of training examples. In some implementations, all neural network layers in the first neural network and the output neural network, as well as the camera CNN if camera image fusion is performed, are trained end-to-end based on a loss function characterizing differences between the network outputs and ground-truth labels for the training examples. The system can update the network parameters based on the loss function computed on the training examples using any appropriate backpropagation-based machine-learning technique, e.g., using the Adam or AdaGrad optimizers.

Figure 2A:
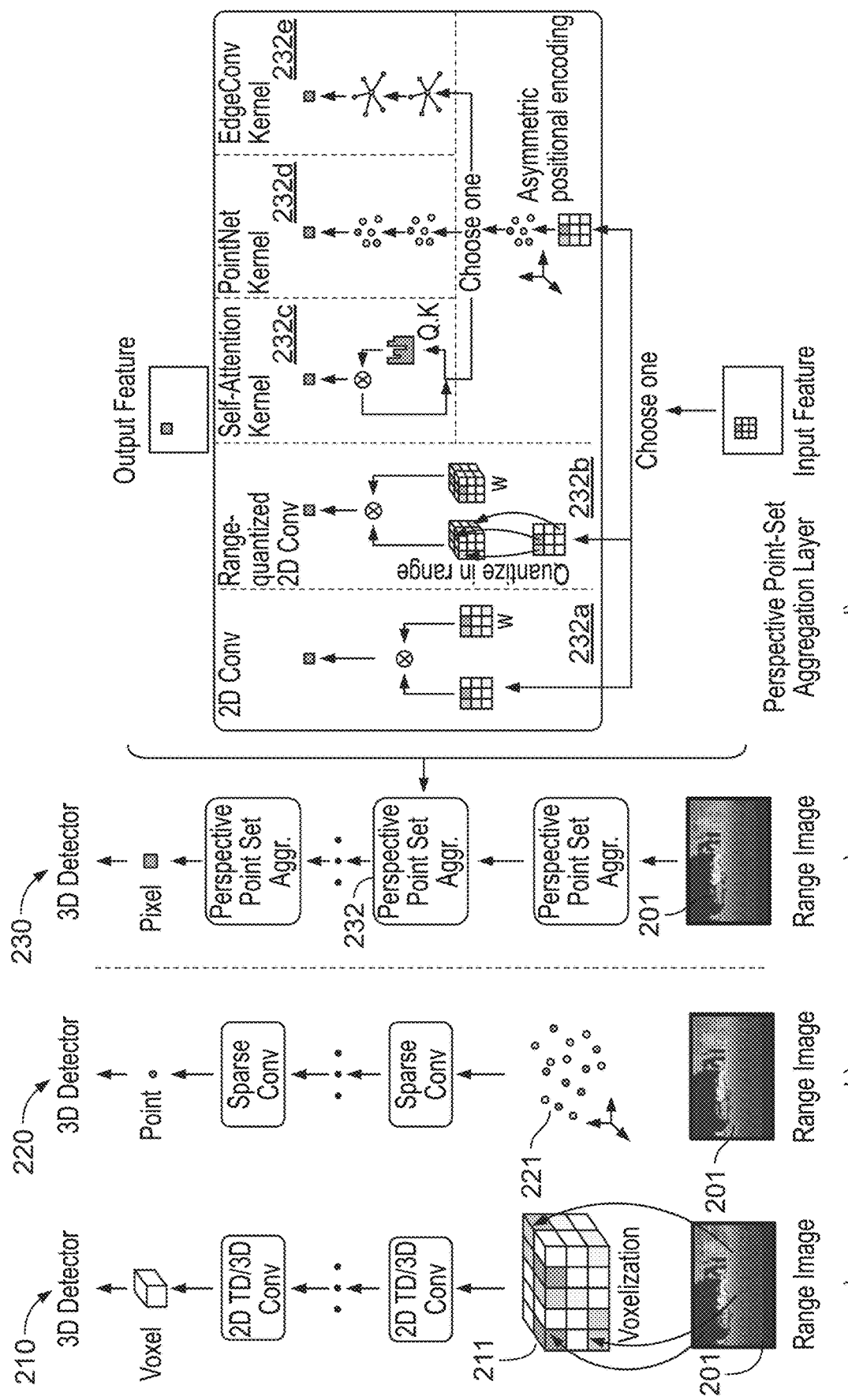
FIG. 2A shows example processes for generating an output feature representation from a perspective view range image.

FIG. 2A shows example processes for generating an output feature representation from a perspective view range image 201.

Column (a) of FIG. 2A illustrates a 3D grid-based process 210 that has been used in the past. The 3D grid-based process first generates a 3D voxel map 211 from the 2D perspective view range image 201, then processes the input 3D voxel map 211 using a 3D convolutional network or a 2D top-down network to generate an output 3D voxel map, and then processes the output 3D voxel map to generate the final prediction result.

Column (b) of FIG. 2A illustrates a 3D graph-model based process 220 that has been used in the past. In this process, the system generates a 3D sparse point cloud 221 from the 2D perspective view range image 201, processes the 3D sparse point cloud 221 using a graph neural network, and makes the final prediction result based on the points outputted by the graph neural network.

Column (c) of FIG. 2A illustrates a process 230 performed by the perspective view range image processing system (such as the system 100 in FIG. 1) described in this specification. In this process, the PPC neural network operates directly on the 2D perspective view range image 201, and the system predicts from the output feature representation map generated by the PPC neural network. The PPC neural network includes one or more perspective point-set aggregation layers 232.

Column (d) of FIG. 2A illustrates 5 different kernels that can be used in the neural network layers of the PPC neural network, including, from left to right, a conventional kernel 232a, a range-quantized convolution kernel 232b, a self-attention kernel 232c, a PointNet kernel 232d, and an edge convolution kernel 232e.

Figure 2B:
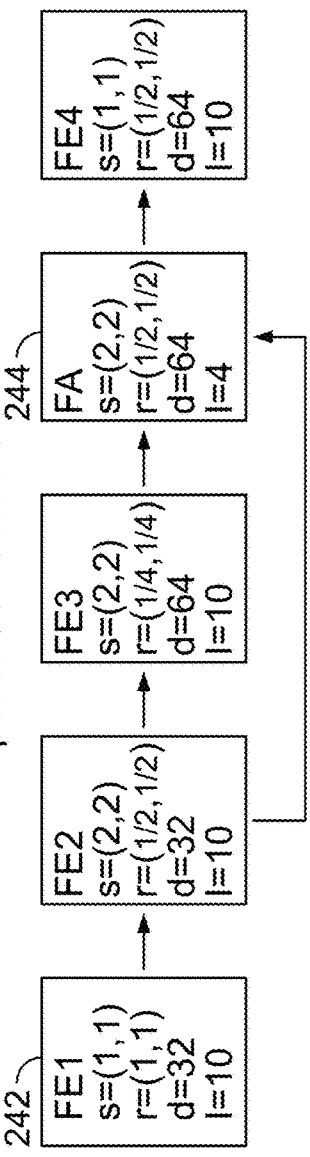
FIG. 2B shows examples of network architectures of a perspective point cloud neural network.
Figure 2B:
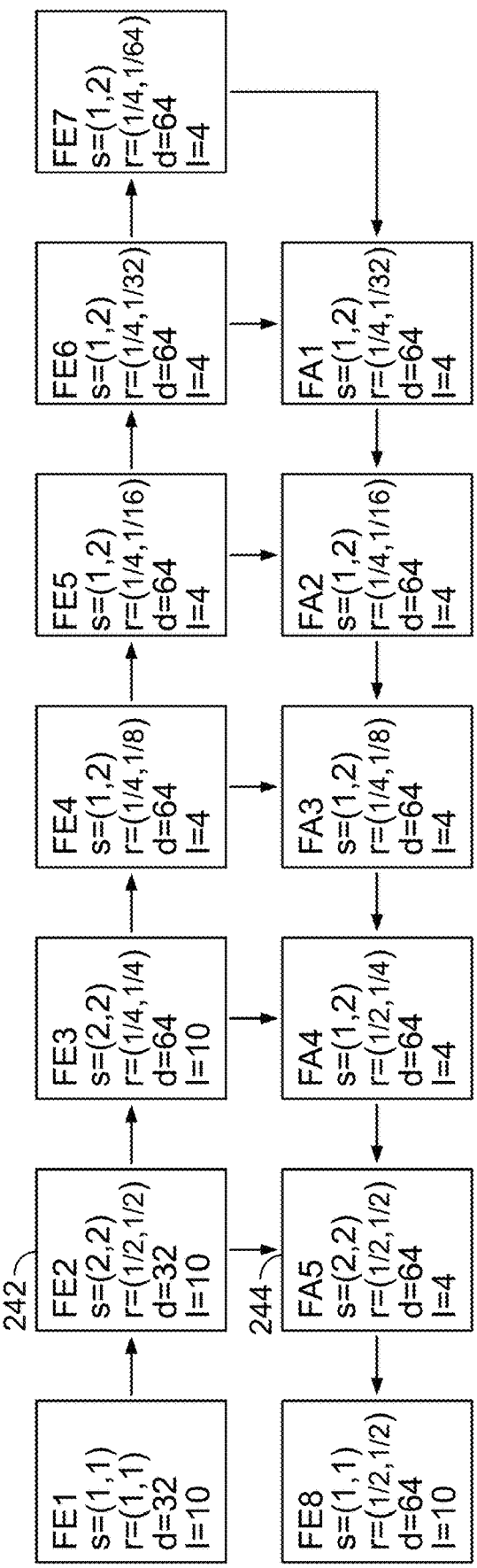

FIG. 2B shows two examples of the backbone architectures of the first neural network.

The architecture of the first neural network can include a plurality of blocks with each block including a plurality of neural network layers. The blocks can be categorized into feature extractor (FE) blocks 242 and feature aggregator (FA) blocks 244.

The FE blocks 242 are configured to extract features. In an example of an FE block, the FE block consists of several perspective point-set aggregation and/or CNN layers. Every two of the perspective point-set aggregation/CNN layers are grouped and bypassed by a skip connection. The FE block can also include a down-sampling layer as the first layer of the block.

The FA blocks 244 are configured to up-sample lower resolution feature maps back to a high resolution for skip connections. In an example of an FA block, the FA block first applies an up-sampling layer to up-sample a lower-resolution feature map. The FA block can further include multiple perspective point-set aggregation and/or CNN layers.

In FIG. 2B, FE and FA are feature extractors and feature aggregators as described above. s is stride in height and width for the down-sampling or up-sampling layer. r is the relative resolution to the original input size after applying the down-sampling or up-sampling layer. d is the number of channels for all perspective point-set aggregation/CNN layers inside the block. l is the number of perspective point-set aggregation/CNN layers.

The top diagram illustrates a neural network backbone architecture 240 for generating features for detecting pedestrians in a scene. The neural network consists of 4 FE blocks 242 and one FA blocks 244.

The bottom diagram illustrates a neural network backbone architecture 250 for generating features for detecting vehicles in a scene. Since vehicles appear wider in the range image and require a larger receptive field, the neural network for modeling vehicle features is deeper compared to a pedestrian model. Correspondingly, the neural network consists of 8 FE blocks 242 and 5 FA blocks in this example 244.

Figure 2C:
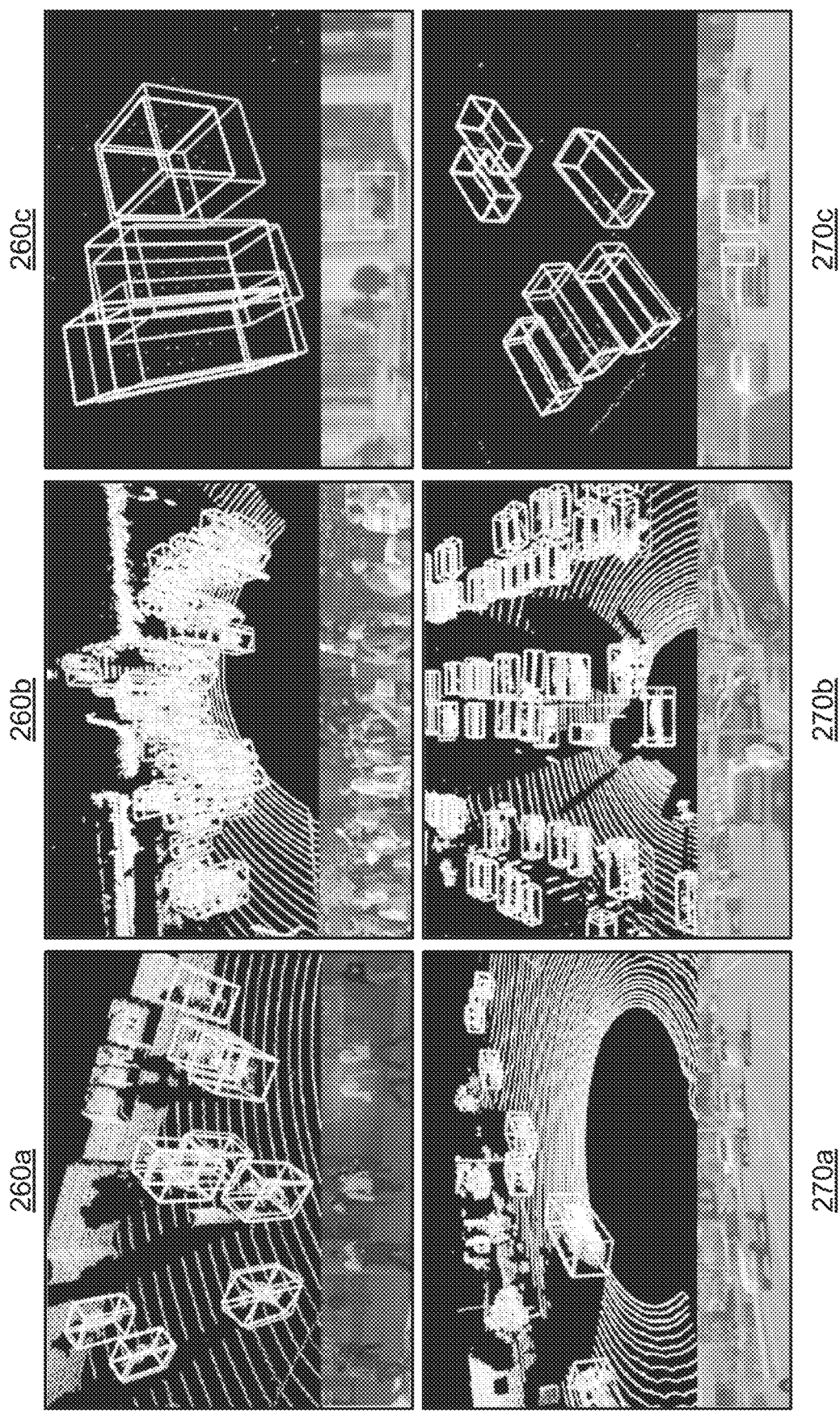
FIG. 2C shows example detection results generated by a perspective view range image processing system.

FIG. 2C shows example detection results generated by a perspective view range image processing system (e.g., the system 100 in FIG. 1). For generating these results, edge convolution kernels are used in the perspective point-set aggregation layers in the first neural network.

The top row of FIG. 2C shows 3 examples (260a, 260b, and 260c) of detecting pedestrians in the scene. The bottom row shows 3 examples (260a, 260b, and 260c) of detecting vehicles in the scene. The white boxes are ground-truth bounding boxes and gray boxes are detection results generated by the perspective view range image processing system.

The examples illustrate different scenarios including when objects are close and mostly visible (e.g., in 260a and 270a), when objects are crowded with severe occlusions (e.g., in 260b and the 270b), and when certain objects are in the long range where points become sparse. Note in the example of 260c, the pedestrian on the right (highlighted in a box on the image) is sitting in a chair. In the example of 270c, there are severe occlusions (highlighted in two boxes on the image) for two cars following two preceding cars. For all the examples shown in FIG. 2C, by adopting the perspective aggregation layers, the system produces detection results that closely match the ground-truth labels, including for challenging scenarios, in an efficient matter.

Figure 3:
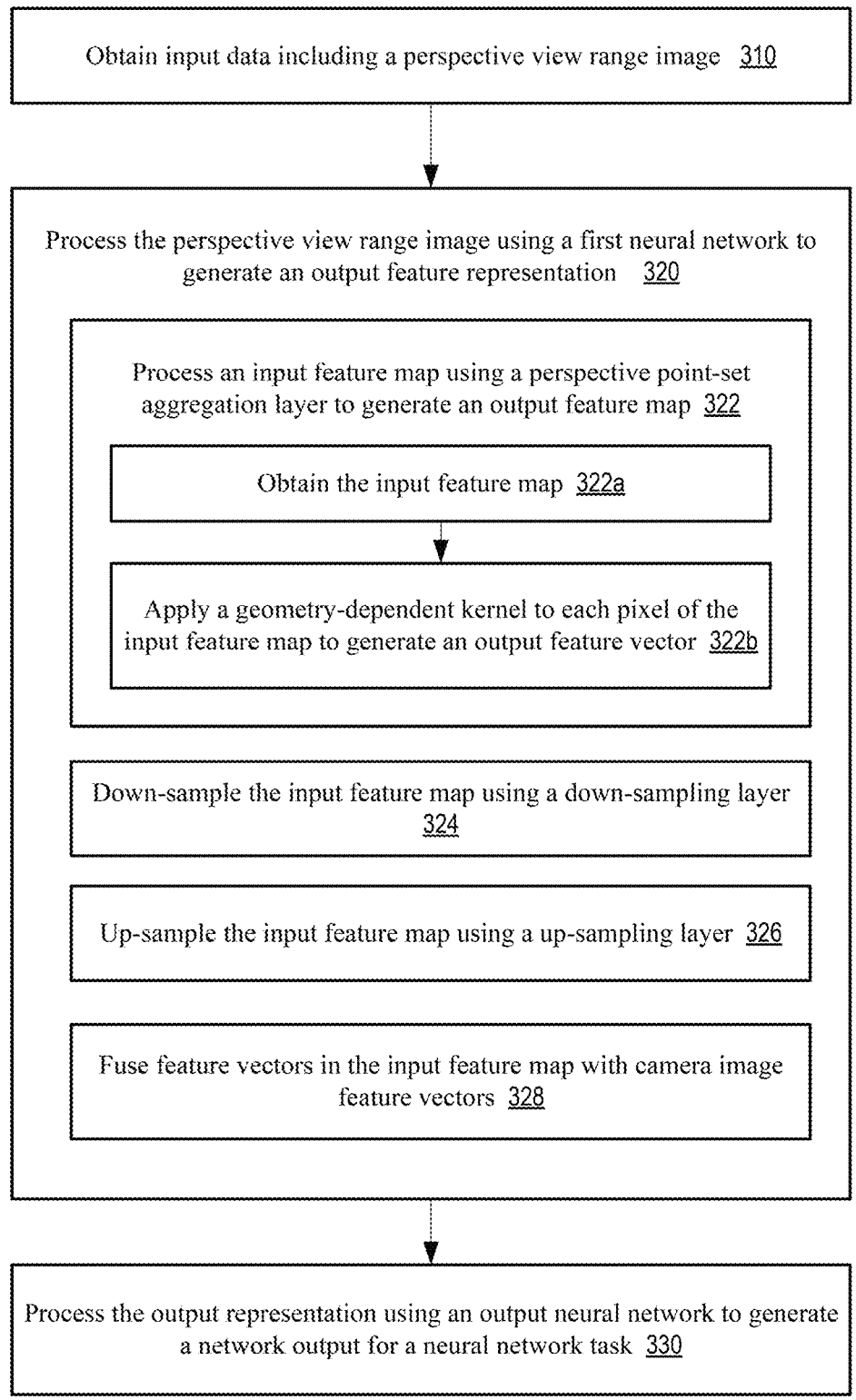
FIG. 3 is a flow diagram illustrating an example process for processing a perspective view range image.

FIG. 3 is a flow diagram illustrating an example process 300 for processing a perspective view range image. For convenience, the process 300 will be described as being performed by a system of one or more computers located in one or more locations. For example, a perspective view range image processing system, e.g., the perspective view range image processing system 100 of FIG. 1, appropriately programmed in accordance with this specification, can perform the process 300 to process the perspective view image.

In step 310, the system obtains input data including data for a perspective view range image. The perspective view range image can be generated from sensor measurements of an environment by one or more sensors. The perspective view range image includes a plurality of pixels arranged in a 2D grid. For each pixel, the data includes features of one or more sensor measurements at a location in the environment corresponding to the pixel. The data further includes, for each pixel, geometry information including range features characterizing a range of the location in the environment corresponding to the pixel relative to the one or more sensors.

In one example, the perspective view range image is generated from sensor measurements from a LiDAR sensor sweeping through the environment. One dimension of the 2D grid of the perspective view range image corresponds to beams of the LiDAR sensor and the other dimension of the two-dimensional grid corresponds to regions of the environment swept through by the LiDAR sensor.

In another example, the perspective view range image is generated from sensor measurements from an RGBD camera. For example, the RGBD camera can generate a 2D map with each pixel corresponding to a depth value and other features such as RGB intensities.

In some implementations, the input data further includes validity data that indicates, for each pixel in the perspective view range image, whether the sensor measurement for the pixel is valid. Data may be missing for certain pixels in the perspective view range image.

In some implementations, the input data can further include camera image data that are available in addition to the perspective view range image data.

In step 320, the system processes the perspective view range image using a first neural network to generate an output feature representation. An example of the first neural network is shown in FIG. 1 (part 120).

A key feature of the first neural network is that it includes one or more perspective point-set aggregation layers. In step 322, the system processes an input feature map using one of the perspective point-set aggregation layers to generate an output feature map. The input feature map includes a respective feature vector for each of a subset of the pixels. The output feature map includes a respective output feature vector for each of the subset of pixels.

Step 322 can include sub-processes 322*a* and 322*b*. In sub-process 322*a*, the system obtains the input feature map for the perspective point-set aggregation layer. In sub-process 322*b*, for each particular pixel in the subset of pixels, the system generates the respective output feature vector by applying a geometry-dependent kernel to pixels in a local neighborhood of the particular pixel in the input feature map. The geometry-dependent kernel depends on at least (i) respective input feature vectors for the pixels within the local neighborhood of the particular pixel in the input feature map and (ii) respective range features of the pixels within the local neighborhood of the input feature map.

In some implementations, the geometry-dependent kernel also depends on, for each pixel in the local neighborhood, whether the sensor measurement for the pixel is valid as indicated by the validity data. For example, when processing using the geometry-dependent kernel, the system can assign the initial output feature vector for each pixel for which the sensor measurements are not valid to a zero vector. Thus, the system can ensure that the processing results are not affected by invalid pixels.

In some implementations, the geometry-dependent kernel can be a range-quantized convolution kernel. The range-quantized convolution kernel is a kernel that, when generating the initial output feature vector for each particular pixel for which the sensor measurements are valid, applies different convolution weights to input feature vectors of pixels depending on a range difference between the pixel and the particular pixel as reflected by the geometry information.

For example, the range-quantized convolution kernel can have k sets of convolution weights. Each of the k sets of convolution weights has a respective scalar range. The convolution weights that are applied to input feature vectors of a given pixel for which the sensor measurements are valid are a combination of sets of convolution weights having respective scalar ranges that are satisfied by the range difference between the pixel and the particular pixel.

In some implementations, the geometry-dependent kernel is a self-attention kernel that applies a self-attention mechanism over the local neighborhood using queries, keys, and values for the pixels in the local neighborhood that are generated from the input feature vectors for the pixels in the local neighborhood. For each pixel in the local neighborhood for which the sensor measurements are valid, the system at least augments the key for the pixel with a positional encoding that represents a relative location of the pixel to the particular pixel as reflected by the geometry information.

In some implementations, the geometry-dependent kernel can be a PointNet kernel. The PointNet kernel is a kernel that, for each pixel in the local neighborhood for each particular pixel for which the sensor measurements are valid, the system processes, for each pixel in the local neighborhood for which the sensor measurements are valid, (i) the input feature vector for the pixel in the local neighborhood and (ii) a positional encoding that represents a relative location of the pixel to the particular pixel as reflected by the respective geometry information for the pixel and the particular pixel using an encoder neural network to generate encoded features for the pixel, and applies max-pooling to the encoded features for the pixels in the local neighborhood to generate the initial output vector for the particular pixel.

In some implementations, the geometry-dependent kernel can be an edge convolution kernel. The edge convolution kernel is a kernel that, for each pixel in the local neighborhood for each particular pixel for which the sensor measurements are valid, the system processes, for each pixel in the local neighborhood for which the sensor measurements are valid, (i) the input feature vector for the pixel in the local neighborhood, (ii) a positional encoding that represents a relative location of the pixel to the particular pixel as reflected by the respective geometry information for the pixel and the particular pixel, and (iii) the input feature vector for the particular pixel using an encoder neural network to generate encoded features for the pixel, and applies max-pooling to the encoded features for the pixels in the local neighborhood to generate the initial output vector for the particular pixel.

In some implementations, in addition to the one or more perspective point-set aggregation layers, the first neural network further includes one or more 2D convolutional layers. The 2D convolutional layer has a kernel (e.g., the inner-product kernel of Eq. 2) that depends only on feature vectors and not on range features.

In some implementations, in addition to the one or more perspective point-set aggregation layers, the first neural network further includes one or more down-sampling layers that down-sample one or more input feature maps based in part on the validity data. Accordingly, the process 300 further includes step 324, in which the system down-samples the input feature map using the corresponding down-sampling layer.

In some implementations, the first neural network further includes one or more up-sampling layers that up-sample one or more input feature maps. Accordingly, step 320 further includes sub-process 326, in which the system up-samples the input feature map using the corresponding up-sampling layer.

In some implementations, step 320 further includes sub-process 328, in which the system further performs a fusing operation to fuse feature vectors in the input feature map with camera image features. For an input feature map for the first layer of the first neural network, the system can generate the input feature map by fusing camera image features with features from the perspective view range image. For a neural network layer that is not the first layer of the first neural network, the system can generate the input feature map by fusing camera image features with output features generated by another neural network layer in the first neural network.

After processing the perspective view range image using the first neural network to generate an output feature representation, the system can perform step 330, in which the system processes the output representation using an output neural network to generate a network output for a neural network task. For example, the neural network task can be an object detection task. The network output can identify portions of the environment where objects are located.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together into a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claim is:

1. A method performed by one or more computers, the method comprising:
    obtaining a perspective view range image generated from sensor measurements of an environment by one or more sensors, the perspective view range image comprising a plurality of pixels arranged in a two-dimensional grid and including, for each pixel, (i) features of one or more sensor measurements at a location in the environment corresponding to the pixel and (ii) geometry information comprising range features characterizing a range of the location in the environment corresponding to the pixel relative to the one or more sensors;
    processing the perspective view range image using a first neural network to generate an output feature representation, wherein the first neural network comprises a first perspective point-set aggregation layer configured to:
        receive an input feature map, the input feature map comprising a respective feature vector for each of a first subset of the pixels; and
        generate an output feature map from the input feature map, wherein the output feature map comprises a respective output feature vector for each of the first subset of pixels, and wherein the generating comprises, for each particular pixel in the first subset, generating an initial output feature vector for the particular pixel by applying a geometry-dependent kernel to pixels within a local neighborhood of the particular pixel in the input feature map, wherein the geometry-dependent kernel depends on at least (i) respective input feature vectors for the pixels within the local neighborhood of the particular pixel in the input feature map and (ii) respective range features of the pixels within the local neighborhood of the input feature map; and
    processing the output feature representation using an output neural network to generate a network output for a neural network task.

2. The method of claim 1, wherein the neural network task is object detection and the network output identifies portions of the environment where objects are located.

3. The method of claim 1 wherein the perspective view range image is generated from sensor measurements from a LiDAR sensor sweeping through the environment, wherein one dimension of the two-dimensional grid corresponds to beams of the LiDAR sensor and wherein the other dimension of the two-dimensional grid corresponds to regions of the environment swept through by the LiDAR sensor.

4. The method of claim 1, wherein the perspective view range image is generated from sensor measurements from an RGBD camera.

5. The method of claim 1, wherein the first neural network further comprises a two-dimensional convolutional layer that has a kernel that depends only on feature vectors and not on range features.

6. The method of claim 1, further comprising:
    obtaining validity data that indicates, for each pixel in the range image, whether the sensor measurements for the pixel are valid;
    wherein the geometry-dependent kernel also depends on, for each pixel in the local neighborhood, whether the sensor measurements for the pixel are valid.

7. The method of claim 6, wherein the geometry-dependent kernel is a geometry-dependent convolution kernel that, when generating the initial output feature vector for each particular pixel for which the sensor measurements are valid, applies different convolution weights to input feature vectors of pixels depending on a range difference between the pixel and the particular pixel as reflected by the geometry information.

8. The method of claim 7, wherein the geometry-dependent kernel has k sets of convolution weights, wherein each of the k sets of convolution weights has a respective scalar range, and wherein the convolution weights that are applied to input feature vectors of a given pixel for which the sensor measurements are valid are a combination of sets of convolution weights having respective scalar ranges that are satisfied by the range difference between the pixel and the particular pixel.

9. The method of claim 6, wherein:
the geometry-dependent kernel is a self-attention kernel that applies a self-attention mechanism over the local neighborhood using queries, keys, and values for the pixels in the local neighborhood that are generated from the input feature vectors for the pixels in the local neighborhood, and
for each pixel in the local neighborhood for which the sensor measurements are valid, at least the key for the pixel is augmented with a positional encoding that represents a relative location of the pixel to the particular pixel as reflected by the geometry information.

10. The method of claim 6, wherein the geometry-dependent kernel is a kernel that:
for each pixel in the local neighborhood for each particular pixel for which the sensor measurements are valid:
for each pixel in the local neighborhood for which the sensor measurements are valid, processes (i) the input feature vector for the pixel in the local neighborhood and (ii) a positional encoding that represents a relative location of the pixel to the particular pixel as reflected by the respective geometry information for the pixel and the particular pixel using an encoder neural network to generate encoded features for the pixel; and
applies max-pooling to the encoded features for the pixels in the local neighborhood to generate the initial output feature vector for the particular pixel.

11. The method of claim 6, wherein the geometry-dependent kernel is a kernel that:
for each pixel in the local neighborhood for each particular pixel for which the sensor measurements are valid:
for each pixel in the local neighborhood for which the sensor measurements are valid, processes (i) the input feature vector for the pixel in the local neighborhood, (ii) a positional encoding that represents a relative location of the pixel to the particular pixel as reflected by the respective geometry information for the pixel and the particular pixel, and (iii) the input feature vector for the particular pixel using an encoder neural network to generate encoded features for the pixel; and
applies max-pooling to the encoded features for the pixels in the local neighborhood to generate the initial output feature vector for the particular pixel.

12. The method of claim 1, further comprising generating the input feature map by fusing camera image features with (i) features from the perspective view range image, (ii) output features generated by another neural network layer in the first neural network, or both.

13. A system comprising one or more computers and one or more storage devices storing instructions that when executed by the one or more computers cause the one or more computers to perform operations comprising:
obtaining a perspective view range image generated from sensor measurements of an environment by one or more sensors, the perspective view range image comprising a plurality of pixels arranged in a two-dimensional grid and including, for each pixel, (i) features of one or more sensor measurements at a location in the environment corresponding to the pixel and (ii) geometry information comprising range features characterizing a range of the location in the environment corresponding to the pixel relative to the one or more sensors;
processing the perspective view range image using a first neural network to generate an output feature representation, wherein the first neural network comprises a first perspective point-set aggregation layer configured to:
receive an input feature map, the input feature map comprising a respective feature vector for each of a first subset of the pixels; and
generate an output feature map from the input feature map, wherein the output feature map comprises a respective output feature vector for each of the first subset of pixels, and wherein the generating comprises, for each particular pixel in the first subset, generating an initial output feature vector for the particular pixel by applying a geometry-dependent kernel to pixels within a local neighborhood of the particular pixel in the input feature map, wherein the geometry-dependent kernel depends on at least (i) respective input feature vectors for the pixels within the local neighborhood of the particular pixel in the input feature map and (ii) respective range features of the pixels within the local neighborhood of the input feature map; and
processing the output feature representation using an output neural network to generate a network output for a neural network task.

14. The system of claim 13, wherein:
the stored instructions further cause the one or more computers to perform: obtaining validity data that indicates, for each pixel in the range image, whether the sensor measurements for the pixel are valid; and
the geometry-dependent kernel also depends on, for each pixel in the local neighborhood, whether the sensor measurements for the pixel are valid.

15. The system of claim 14, wherein the geometry-dependent kernel is a geometry-dependent convolution kernel that, when generating the initial output feature vector for each particular pixel for which the sensor measurements are valid, applies different convolution weights to input feature vectors of pixels depending on a range difference between the pixel and the particular pixel as reflected by the geometry information.

16. The system of claim 14, wherein
the geometry-dependent kernel is a self-attention kernel that applies a self-attention mechanism over the local neighborhood using queries, keys, and values for the pixels in the local neighborhood that are generated from the input feature vectors for the pixels in the local neighborhood, and
for each pixel in the local neighborhood for which the sensor measurements are valid, at least the key for the pixel is augmented with a positional encoding that represents a relative location of the pixel to the particular pixel as reflected by the geometry information.

17. The system of claim 14, wherein the geometry-dependent kernel is a kernel that:
   for each pixel in the local neighborhood for each particular pixel for which the sensor measurements are valid:
      for each pixel in the local neighborhood for which the sensor measurements are valid, processes (i) the input feature vector for the pixel in the local neighborhood and (ii) a positional encoding that represents a relative location of the pixel to the particular pixel as reflected by the respective geometry information for the pixel and the particular pixel using an encoder neural network to generate encoded features for the pixel; and
      applies max-pooling to the encoded features for the pixels in the local neighborhood to generate the initial output feature vector for the particular pixel.

18. The system of claim 14, wherein the geometry-dependent kernel is a kernel that:
   for each pixel in the local neighborhood for each particular pixel for which the sensor measurements are valid:
      for each pixel in the local neighborhood for which the sensor measurements are valid, processes (i) the input feature vector for the pixel in the local neighborhood, (ii) a positional encoding that represents a relative location of the pixel to the particular pixel as reflected by the respective geometry information for the pixel and the particular pixel, and (iii) the input feature vector for the particular pixel using an encoder neural network to generate encoded features for the pixel; and
      applies max-pooling to the encoded features for the pixels in the local neighborhood to generate the initial output feature vector for the particular pixel.

19. One or more non-transitory computer-readable storage media storing instructions that when executed by one or more computers cause the one or more computers to perform operations comprising:
   obtaining a perspective view range image generated from sensor measurements of an environment by one or more sensors, the perspective view range image comprising a plurality of pixels arranged in a two-dimensional grid and including, for each pixel, (i) features of one or more sensor measurements at a location in the environment corresponding to the pixel and (ii) geometry information comprising range features characterizing a range of the location in the environment corresponding to the pixel relative to the one or more sensors;
   processing the perspective view range image using a first neural network to generate an output feature representation, wherein the first neural network comprises a first perspective point-set aggregation layer configured to:
      receive an input feature map, the input feature map comprising a respective feature vector for each of a first subset of the pixels; and
      generate an output feature map from the input feature map, wherein the output feature map comprises a respective output feature vector for each of the first subset of pixels, and wherein the generating comprises, for each particular pixel in the first subset, generating an initial output feature vector for the particular pixel by applying a geometry-dependent kernel to pixels within a local neighborhood of the particular pixel in the input feature map, wherein the geometry-dependent kernel depends on at least (i) respective input feature vectors for the pixels within the local neighborhood of the particular pixel in the input feature map and (ii) respective range features of the pixels within the local neighborhood of the input feature map; and
   processing the output feature representation using an output neural network to generate a network output for a neural network task.

20. The one or more non-transitory computer storage media of claim 19, the operations further comprising:
   obtaining validity data that indicates, for each pixel in the range image, whether the sensor measurement for the pixel is valid; and
   wherein the first neural network further comprises one or more down-sampling layers that down-sample an input feature map based in part on the validity data.

* * * * *